United States Patent [19]
Pelenc et al.

[11] 3,721,874
[45] March 20, 1973

[54] LINEAR INDUCTION MOTOR PROPULSION SYSTEM

[75] Inventors: Yves Pelenc, 38 La Tronche; Jacques Gatellet, 38 Grenoble, both of France

[73] Assignee: Merlin Gerin, 38 Grenoble, France

[22] Filed: Jan. 12, 1972

[21] Appl. No.: 217,198

[52] U.S. Cl...............318/135, 310/12, 318/207 R, 318/218
[51] Int. Cl.............................................H02p 7/36
[58] Field of Search....318/135, 38, 687, 207, 207 D, 318/218, 219, 220, 221; 310/12; 104/148 LM

[56] References Cited
UNITED STATES PATENTS

| 3,356,041 | 12/1967 | Bliss | 310/12 X |
|---|---|---|---|
| 3,577,929 | 5/1971 | Onoda et al. | 318/135 UX |

*Primary Examiner*—J. D. Miller
*Assistant Examiner*—H. Huberfeld
*Attorney*—Richard K. Stevens et al.

[57] ABSTRACT

A linear induction motor propulsion device for propelling in synchronism a plurality of armatures along a plurality of polyphase energizable stator members. The phase sequence of the supply voltage of the different stator members is periodically inverted according to a predetermined program in such a manner that the thrust characteristic wave form has attenuated leading and trailing edges.

13 Claims, 9 Drawing Figures

LINEAR INDUCTION MOTOR PROPULSION SYSTEM

This invention relates to a linear induction motor propulsion system having a plurality of stator members longitudinally spaced apart along a predetermined path or trackway and a plurality of armatures guided along the path and driven by the stator members.

Circular looms have been described having a plurality of shuttles which are moved along a circular stator comprising a number of polyphase energizable stator sections which are sequentially energized by a revolving selector switch having contact groups associated with the shuttles to produce a magnetic field wave which travels along the circular stator. The square wave form comprises a number of "tops" corresponding to the number of shuttles and the square tops are separated by zero magnetic fields or by braking magnetic fields traveling in the opposite direction (counter-running fields). At the start the different shuttles must be placed in the corresponding tops and the switch is then revolved at increasing speeds whereby the shuttles are retained in their tops. The group velocity of the magnetic field corresponds to the speed of rotation of the switch and, of course, determines the speed of the shuttles as long as the latter do not fall out of step. The group velocity must be smaller than the phase (synchronous) velocity of the magnetic fields with respect to the stator because of the slip inherent to the working of an induction motor. The square wave form of the tops has the drawback of producing jerks of the shuttles as soon as the latter "ride on" the edges (front or tail portions) of the tops.

It is an object of the invention to provide a propulsion system having an improved thrust wave form that prevents jerks of the armatures and of the vehicles which are integral with the armatures so that a better comfort is acquired in the case of people movers and generally less stresses of the material.

It is another object of the invention to provide a simpler switching system.

A further object of the invention to provide a system having improved pulling into step characteristics permitting easy "meet" conditions of the armatures with the synchronizing tops of the thrust wave at the departure of the armatures.

In the propulsion system according to the invention the polyphase stator members which are longitudinally aligned along the path are associated in groups of $2k$ successive units, $k$ being greater than unit, and all groups are connected to a polyphase source according to the same cycle whereby each pair of stator members of ranks $n$ and $n+k$ ($1 \leq n \leq k$) of each group produce magnetic fields traveling along the path in opposite direction. The system comprises switch means to connect the stator members to the source selectively in positive or in negative phase sequence and whereby the phase sequence is periodically reversed, simultaneously for both stator members of each pair and for all pairs according to a recurring phase cycle of the order $k$.

These and other objects and items of the invention will become apparent from the following description which refers to the annexed drawings in which.

Figure 1:
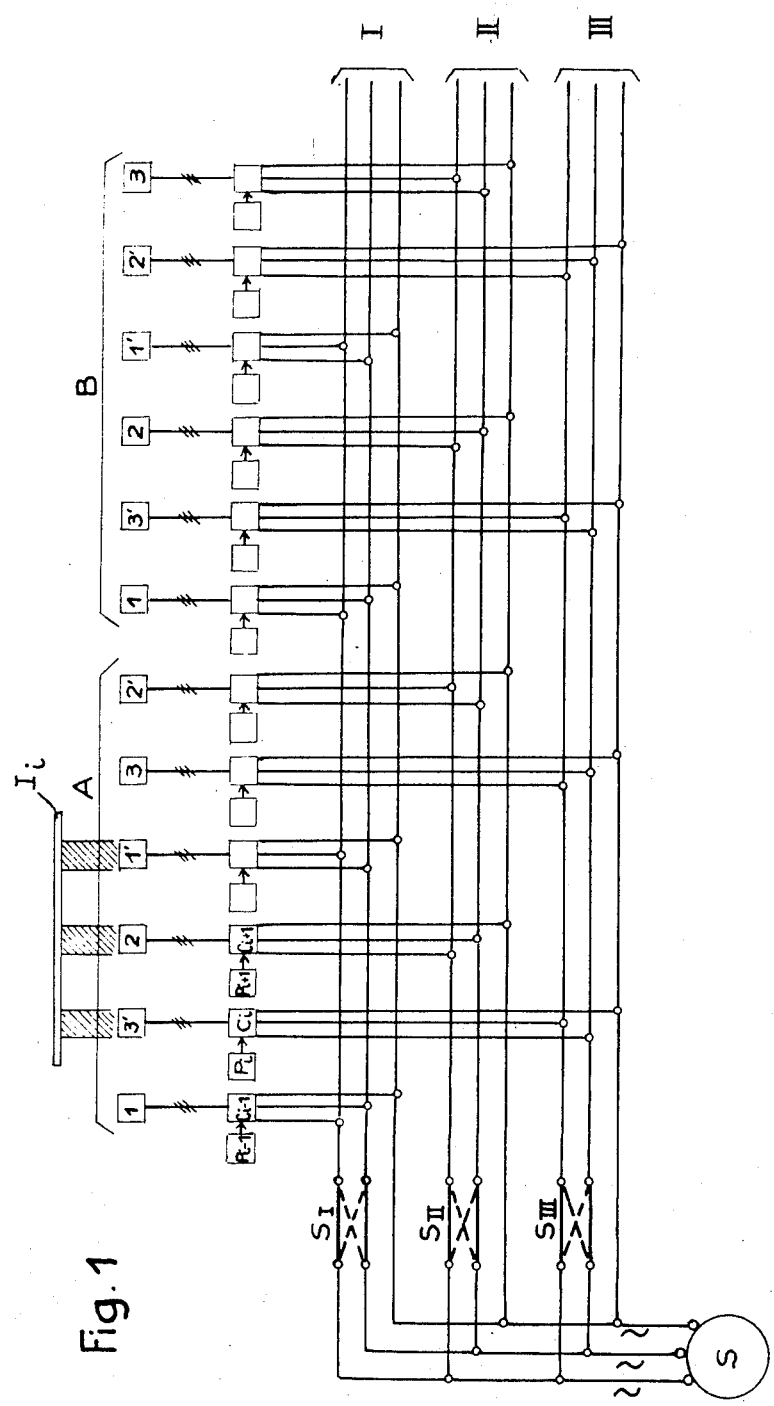
FIG. 1 shows the block diagram of a first section of two groups having each $2k = 6$ stator members connectable to a three phase source.

In FIG. 1, there are shown 12 three-phase stator members longitudinally aligned and spaced apart along a rectilinear path and constituting two groups A and B of each $2k = 6$ stator members designated by the numerals 1, 3′, 2,1′, 3 and 2′. Each stator member carries a three-phase winding (not shown) producing, when three-phase energized, a magnetic field traveling along the path in one direction or the other. All the stator members are of identical construction and the system can comprise any desired number of groups, all groups being connected, when energized, to a source S of three-phase electrical energy according to the same cycle or program. In each energized group, both stator members of ranks $n$ and $n + k$ ($1 \leq n \leq k$) are connected to the source S in such a manner that they produce magnetic fields traveling in opposite directions along said path. In other words, if one of the stator members of each pair produces a forwardly running magnetic field, the other stator member (separated by $k$ intermediate stator members from the first named member) produces a counter-running magnetic field. Thus, in the embodiment shown, the field of stator member 1 is always running in opposite direction to the direction of the field of member 1′ and the same condition is true for stator members 2 and 2′, and 3 and 3′, respectively, of all groups as long as the groups are energized. As a matter of fact, the groups which do not have an armature in their vicinity may be disconnected as will be explained hereinbelow. In the embodiment shown all stator members were assumed identical so that the condition of counter-running fields is obtained by connecting both members of each pair of stator members in parallel but in opposite phase sequence to the source. Of course, it is also possible to utilize for each pair stator members having three-phase windings which are wound in opposite senses and in such cases both members of each pair must be connected in parallel to the source without permanent reversal of the phase sequence.

Three three-phase supply lines I, II and III extend parallelly along the path defined by the stator members to which they are connected directly or, as shown, through contactors $C_i$, line I feeding the stator members 1 and 1'; line II the members 2 and 2'; and line III the members 3 and 3' of all groups. The three-phase source S supplies a polyphase voltage to the lines I, II and III whereby three phase sequence-reversing switches $S_I$, $S_{II}$ and $S_{III}$ are connected in series with two phase conductors of lines I, II and III, respectively, to permit the connection of the different stator members to the source S in positive or in negative phase sequence, as desired. The switches $S_I$, $S_{II}$ and $S_{III}$ are preferably switches having a third intermediate position in which the corresponding stator members are disconnected from the source so that each phase sequence reversal is preceded by a zero-voltage interval.

Each contact $C_i$ is controlled by a position switch $P_i$ detecting the proximity of an armature and closing the corresponding contactor as soon as an armature comes in the operation field of the stator member. In this case, the source S and the supply lines I, II and III need only be laid out for the power utilized for the propulsion of the armatures and not also for the power of temporarily inoperative stator members.

In the embodiment shown, a third phase conductor is present in all lines I, II and III but this conductor, which is not switched as the remaining two conductors of each line, can be common to the three lines.

The armatures $I_i$, one of which is only shown, are guided in any suitable way along the path and secured to vehicles to be displaced (not shown). Each armature $I_i$ has a length spanning $k = 3$ stator members so as to totalize the partial thrusts exerted by three successive stator members thereon. The full result of the invention cannot be obtained by an armature spanning less (for instance two) stator members or more (for instance four; however an armature spanning $3k$, $5k$ etc. stator members would work but seems without practical interest).

Figure 2:
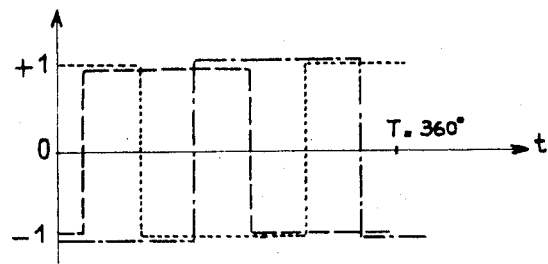
FIG. 2 shows a supply diagram of a group with instantaneous phase reversal.
Figure 5:
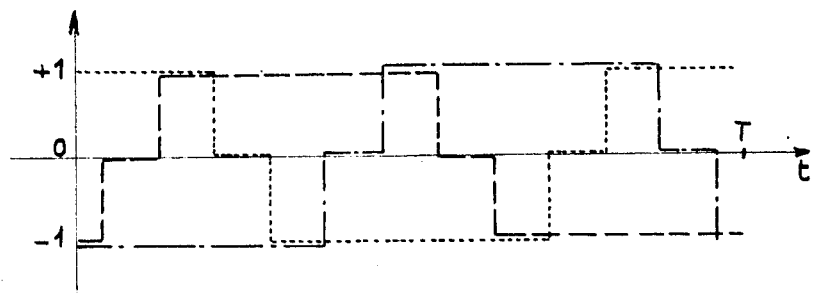
FIG. 5 shows a supply diagram whereby each phase sequence reversal is preceded by an interval of zero voltage, the duration of which being in the embodiment shown equal to T/12, T being the period of repetition of the switching cycle.

In the diagrams, the curves associated with line I are shown in dotted lines, those associated with line II in dashed lines and those associated with line III in chain-dotted lines. The total or resultant thrust is shown in full lines. In FIG. 2 and 5, the supply schedule of the stator members is symbolically shown as $+ 1$ if the stator members associated with one of the lines I, II and III is connected to the three-phase source in positive phase sequence; as $- 1$ in case of negative phase sequence; and as 0 if the corresponding stator members are disconnected from the source.

FIG. 2 shows the supply cycle comprising instantaneous reversal of the phase sequence. As shown, the feeding of the $2k = 6$ stator members of each group takes place as a symmetrical phase cycle of the order $k$, that is a symmetrical three-phase cycle in the embodiment shown, whereby all the stator members are always connected to the three-phase source but with reversal of the phase sequence twice per period of duration T, otherwise stated every 180 electrical degrees. The two stator members of ranks $n$ and $n + k$ ($1 \leq n \leq k$) are simultaneously phase sequence-reversed and the reversals of stator members are regularly spaced apart for the $k = 3$ pairs of each group like the up-and-down-going zero crossings of a three-phase symmetrical alternating current. The reversals are preferably equally spaced apart and thus separated by time intervals of $T/6$.

Figure 3:
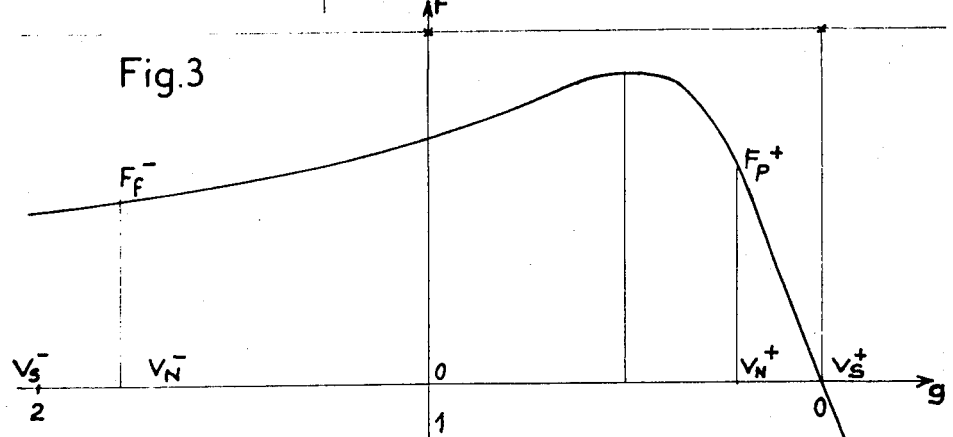
FIG. 3 shows a diagram of the thrust produced by a stator member on an armature as a function of slip for a given position of the armature with respect to the stator member.

FIG. 3 shows the spatial diagram of the partial thrusts exerted on an armature by a stator member whereby the vertical scale of the figure varies somewhat with the position of the armature with respect to the stator member. The thrust is shown in a well known manner as a function of slip $g$ and the armature is assumed to move in synchronism with the speed $V_N$ of the phase sequence reversals. The group velocity $V_N$ of the resultant thrust wave should be lower than the phase velocity $V_S$ (synchronous speed) of the magnetic traveling fields of the stator members in order to avoid falling out of step of these members. The working point on the thrust curve and the stability of the armatures is determined by the choice of $V_N$ for a given phase sequence (positive or negative). To a propulsion thrust $F_P$ determined by the reversal speed $V_N^+$ for a positive (say) phase sequence corresponds a braking thrust $F_f$ determined by the reversal speed $V_N^-$ for the negative phase sequence whereby $V_N^+$ and $V_N^-$ are located symmetrically with respect to the point $g = 1$.

In the following it has been assumed that $F_P = F_f$ for a better understanding of the principles underlying the invention and the variations of the thrust resulting from the relative position of an armature with respect to the three stator members with which it cooperates.

Figure 4:
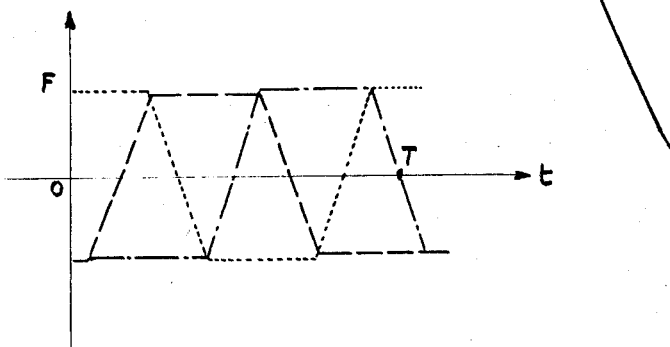
FIG. 4 shows a diagram of the partial thrusts and of the total thrust exerted by three successive stator members on an armature.

The instantaneous phase sequence reversal does not produce an instantaneous reversing of the thrust exerted by a stator member on an armature because of transient phenomena resulting from the different time responses of the magnetic and electric circuits. FIG. 4 shows how an actual thrust characteristic may be whereby the transient thrusts have been assumed to be a linear function of time of a duration of $t = T/6$.

In the supply cycle of FIG. 5, each phase sequence reversal is preceded by a zero voltage interval during which the corresponding stator members are disconnected from the source. As shows FIG. 6, the zero-voltage intervals have a benefic effect on the resulting moving total thrust wave form, whereby it has been assumed that the duration of each zero-voltage interval is equal to $T/12$.

Figure 6:
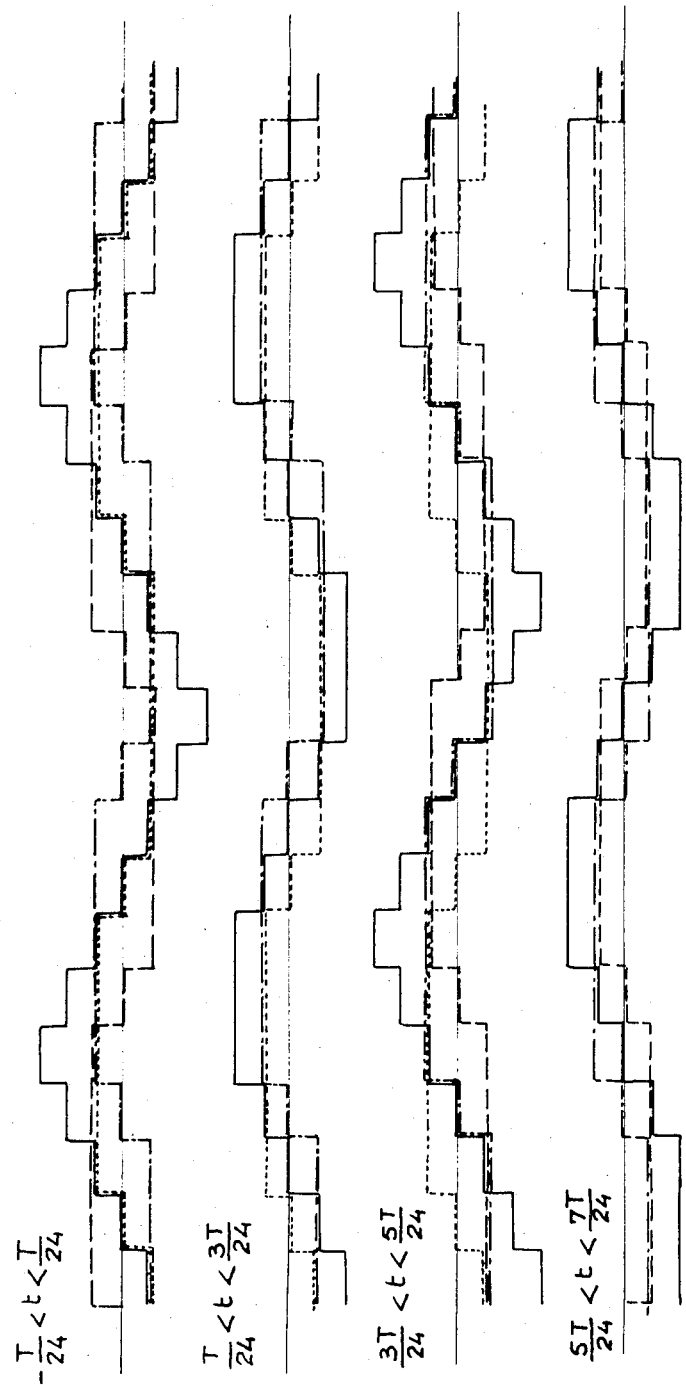
FIG. 6 shows schematically at four different points of time the wave form of the partial and total thrust exerted by three successive stator members on an armature.

In FIG. 6 there is shown the spatial wave form of the partial thrusts and of the total thrust exerted on an armature by three successive stator members, which are feeded according to the cycle shown in FIG. 5, at four different time intervals, respectively for $-T/24 < t < T/24$ ; $T/24 < t < 3T/24$ ; $3T/24 < t < 5T/24$; and $5T/24 < t < 7T/24$. The total thrust shown in full lines is the sum of the three partial thrusts and it can be seen that the front and trailing edges of the total thrust wave are stepped (transient phenomena have been neglected) whereby the wave form changes every $T/12$ seconds. The stepped edges damp the jerks of the armatures which are pulled or braked by the half waves. The action of the transient phenomena referred to above is benefic in that the discontinuities of the steps are faired so as to further damp the jerks transmitted to the armatures to be synchronized and "riding on the steps" as they move along the path within a top of the thrust wave.

Figure 7:
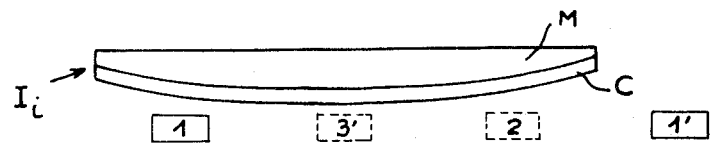
FIG. 7 shows a schematic elevational view of an armature having an air gap of variable length.
Figure 8:
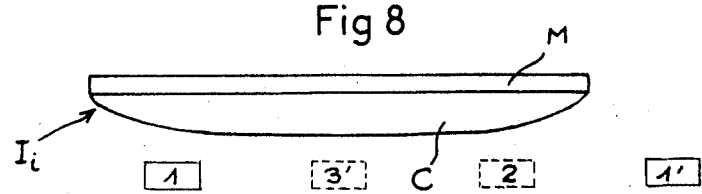
FIG. 8 shows a schematic elevational view of an armature of variable thickness.

The edges of the total thrust wave form may be further smoothed out by an appropriate construction of the armature permitting to obtain a substantially sinusoidal wave form at every moment. FIG. 7 shows that this adaption of an armature may consist of a suitable "fairing" of the magnetic yoke M procuring an increase of the air gap (and of the magnetic reluctance) defined between an armature and the stator members from the center of the armature towards both ends thereof. The same result may be obtained according to FIG. 8 by a diminuation of the height of the electrically conductive part C of the armature or by other arrangements modifying the impedance of the armature.

Figure 9:
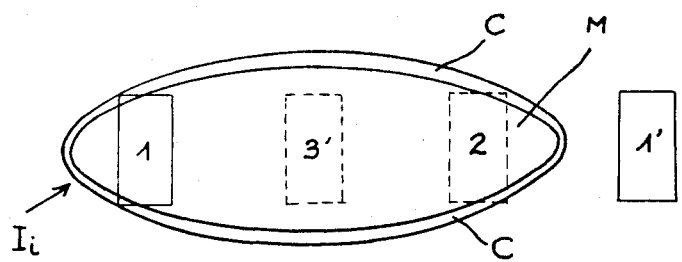
FIG. 9 shows a plan view of an armature of variable width.

FIG. 9 shows an embodiment wherein the object of the smoothing out of the edges of the thrust wave form is attained by the provision of armatures of variable width having tapering end portions. It is possible to modulate the peak value of the amplitude of the sinusoidal polyphase voltage of the source, preferably sinusoidally, at a frequency corresponding to the frequency of the phase sequence reversing cycle whereby the phase order reverse switching may be operated at zero voltage. If the spatial wave shape of the resulting thrust is substantially sinusoidal, one obtains thus a thrust wave of invariable shape which travels uniformly along the travel path, whereas in other cases the wave form is submitted to cyclic changes, advancing by small jumps.

It is of course possible to provide a phase sequence reversing cycle of an order different from three, such as a hexaphase system. The voltage source is preferably three-phase but a different number of phases can also be adopted.

What is claimed is:

1. A linear induction motor system for propelling a plurality of independent armatures guided along a predetermined path, comprising a plurality of polyphase stator members regularly spaced apart along said path and extending each longitudinally along a portion of said path to produce, when polyphase energized, a magnetic traveling field moving along said path, a polyphase source of electric energy, and means to connect said source selectively to said stator members in positive or negative phase sequence, said stator members being associated in groups of 2 $k$ successive units, $k$ being an integer $\geq 2$, to be connected to said source according to the same cycle, the stator members of each pair of stator members of ranks $n$ and $n + k$ ($l \leq n \leq k$) of each group being adapted and electrically connected to produce magnetic fields traveling in opposite directions and to be simultaneously phase sequence-reversed, each armature being dimensioned to span $k$ successive stator members, said cycle providing the phase sequence reversing of the $k$ pairs of stator members of each group at regularly spaced apart points of time, said cycle being at phase cycle of the order $k$ and of such a frequency that the mean group velocity of the total thrust wave exerted on each armature is lower than the phase velocity of said magnetic traveling field.

2. A system according to claim 1, said cycle providing before each phase sequence-reversal an interval of zero voltage during which the corresponding stator members are disconnected from the source.

3. A system according to claim 1, each armature being adapted to smooth out the discontinuities of the leading and trailing edges of the wave form of the total thrust exerted on the armature.

4. A system according to claim 3, the width of each armature diminishing from the middle part towards the ends.

5. A system according to claim 3, each armature comprising a magnetic circuit cooperating with the stator members so that the magnetic reluctance increases from the middle part towards the ends of the armature.

6. A system according to claim 3, each armature comprising an electrically conducting part the impedance of which diminishes regularly from the middle part towards the ends of the armature.

7. A system according to claim 1, further comprising modulating means to modulate the amplitude of the sinusoidal polyphase voltage of said source at a frequency identical to the frequency of said phase cycle.

8. A system according to claim 7, said modulating means modulating said amplitude sinusoidally.

9. A system according to claim 8, said means connecting said source to said stator members being adapted to operate said phase sequence-reversal at zero voltage of said amplitude.

10. A system according to claim 1, $k$ being equal to three.

11. A system according to claim 1, further comprising detecting means to energize only stator members being in the immediate vicinity of an armature.

12. A system according to claim 11, said detecting means comprising position switches detecting the position of said armatures.

13. A system according to claim 1, comprising $k$ poly-phase lines extending along said path to connect said stator members to said source through $k$ phase-sequence reversing switches.

* * * * *